United States Patent
Hu et al.

(10) Patent No.: US 6,233,304 B1
(45) Date of Patent: May 15, 2001

(54) METHODS AND APPARATUS FOR CALCIFICATION SCORING

(75) Inventors: Hui Hu, Waukesha; Robert A. Buchanan, Dousman; Theophano Mitsa, Waukesha, all of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/199,513

(22) Filed: Nov. 25, 1998

(51) Int. Cl.$^7$ ............................................. A61B 6/03
(52) U.S. Cl. ................................... 378/8; 378/15
(58) Field of Search .................. 378/4, 8, 15, 37, 378/98, 98.2, 98.8

(56) References Cited

U.S. PATENT DOCUMENTS

| | | |
|---|---|---|
| 4,837,686 | 6/1989 | Sones et al. . |
| 5,864,146 * | 1/1999 | Karellas ............................. 250/581 |

FOREIGN PATENT DOCUMENTS

WO 99/09887    3/1999  (WO) .

OTHER PUBLICATIONS

Ukai et al., "A coronary calcification diagnosis system based on helical CT images," IEEE Nuclear Science Symposium Conference Record, Albuquerque, NM, Nov. 9–15, 1997, pp. 1208–1212.

Akinami Ohhashi et al., "Application of a neural network to automatic gray-level adjustment for medical images," Proc of the International Joint Conf. on Neural Networks, New York, IEEE., Nov. 18, 1991 pp. 974–980.

Wilson et al., "Automated detection of microcalcifications in mammograms through application of image pixel remapping and statistical filter," Proc. 11th IEEE Symp. on Computer–Based medical Systems, Lubbock, TX, Jun. 12–14, 1998, pp. 270–274.

Measurement of Coronary Artery Calcium with Dual–Slice Helical CT Commpared with Coronary Angiography: Evaluation of CT Scoring Methods, interobserver Variations, and Reproducibility, L. Broderick et al., *AJR Am J Roentgenaol*1996 Aug;167 (2); pp. 439–444.

Cornary Artery Calcium: Alternate Methods for Accurate and Reproducible Quantitation, H. Yoon, M.D. et al, *Acad Radiol*1997 Oct;4(10): pp. 666–73.

Quantifications of Coronary Artery Calcium using Ultrafact Computed Tomogaphy, A. Agatston, M.D. et al., *J Am Coll Cardiol*, 1990 Mar. 15;15(4): pp. 827–32.

* cited by examiner

Primary Examiner—David V. Bruce
(74) Attorney, Agent, or Firm—Armstrong Teasdale LLP; Christian G. Cabou

(57)  ABSTRACT

The present invention, in one form, is a method for generating a calcification score in a CT image data using a scoring algorithm. In accordance with one embodiment of the algorithm, a calcium score is determined by identifying a scorable region in the image data, defining at least one region of interest in the scorable region, and determining a density score. After determining a calcium score for each region of interest, a total calcium score is determined. In addition, to correct for unequal and/or non-contiguous spacing of the slices of image data, a weighted total calcium score is determined.

11 Claims, 2 Drawing Sheets

METHODS AND APPARATUS FOR CALCIFICATION SCORING

BACKGROUND OF THE INVENTION

This invention relates generally to computed tomography (CT) imaging and more particularly, to generating a CT image calcification score.

In at least one known CT system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector. In an axial scan, the projection data is processed to construct an image that corresponds to a two dimensional slice taken through the object.

One method for reconstructing an image from a set of projection data is referred to in the art as the filtered backprojection technique. This process converts the attenuation measurements from a scan into integers called "CT numbers" or "Hounsfield units", which are used to control the brightness of a corresponding pixel on a cathode ray tube display.

To reduce the total scan time required for multiple slices, a "helical" scan may be performed. To perform a "helical" scan, the patient is moved while the data for the prescribed number of slices is acquired. Such a system generates a single helix from a one fan beam helical scan. The helix mapped out by the fan beam yields projection data from which images in each prescribed slice may be reconstructed. In addition to reduced scanning time, helical scanning provides other advantages such as improved image quality and better control of contrast.

In helical scanning, and as explained above, only one view of data is collected at each slice location. To reconstruct an image of a slice, the other view data for the slice is generated based on the data collected for other views. Helical reconstruction algorithms are known, and described, for example, in C. Crawford and K. King, "Computed Tomography Scanning with Simultaneous Patient Translation," *Med. Phys.* 17(6), Nov/Dec 1990.

At least one known imaging system, known as an electron beam imaging system, is used to identify evidence of coronary atherosclerosis by detecting coronary artery calcification (CAC). In identifying CAC in the image data, a calcification level is determined. However, the electron beam imaging systems are very expensive and located in a limited number of geographical locations. To date, the use of general purpose CT imaging systems have been unable to generate stable and consistent calcification levels. One factor of the inconsistent results is the uneven and/or non-contiguous, spacing of the image data.

It would be desirable to generate a stable and consistent calcification score using image data from a general purpose CT imaging system. It also would be desirable to correct the calcification score for unevenly and/or non-contiguously spaced slices of image data.

BRIEF SUMMARY OF THE INVENTION

These and other objects may be attained by a calcification scoring algorithm that generates a calcification level using a general purpose CT imaging system. In accordance with one embodiment of the present invention, the patient is scanned to generate projection data. The projection data is processed to generate image data. The image data is then processed to determine a calcification score representative of coronary artery calcification. The calcification score is determined by identifying a scorable region in the image data, defining at least one region of interest in the scorable region, and determining a density score. After determining a calcium score for each region of interest, a total calcium score is determined by summing the calcium score from each region of interest. The total calcium level represents the calcification level of the image data.

In one embodiment, the total calcium score is corrected for non-evenly and/or non-contiguously spaced slices of image data. More specifically, where the image data represents unevenly and/or non-contiguously spaced slices of data, the algorithm weights the calcium score from each region of interest to correct for the slice spacing problem.

The above described algorithm generates a calcification score of image data generated from a general purpose CT imaging system. In addition, the algorithm corrects for non-evenly and/or non-contiguously spaced slices of image data.

DETAILED DESCRIPTION OF THE INVENTION

Figure 1:
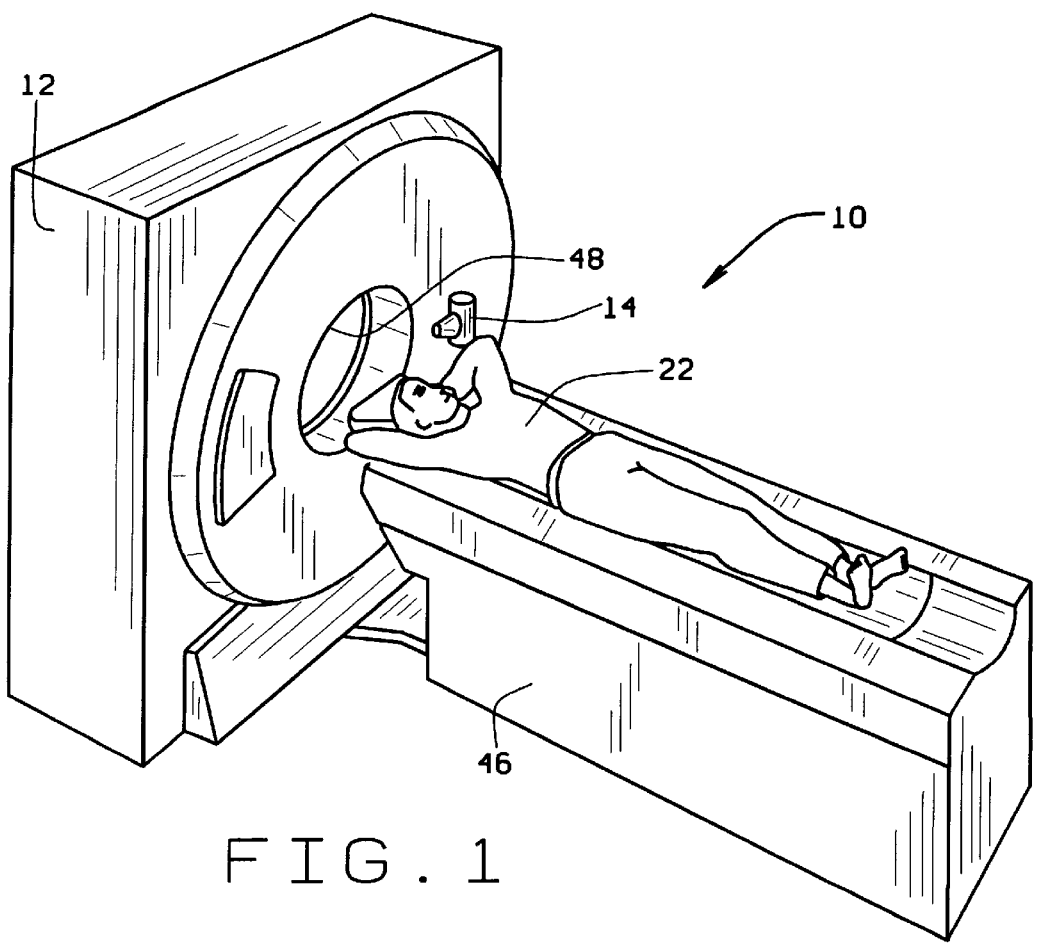
FIG. 1 is a pictorial view of a CT imaging system.
Figure 2:
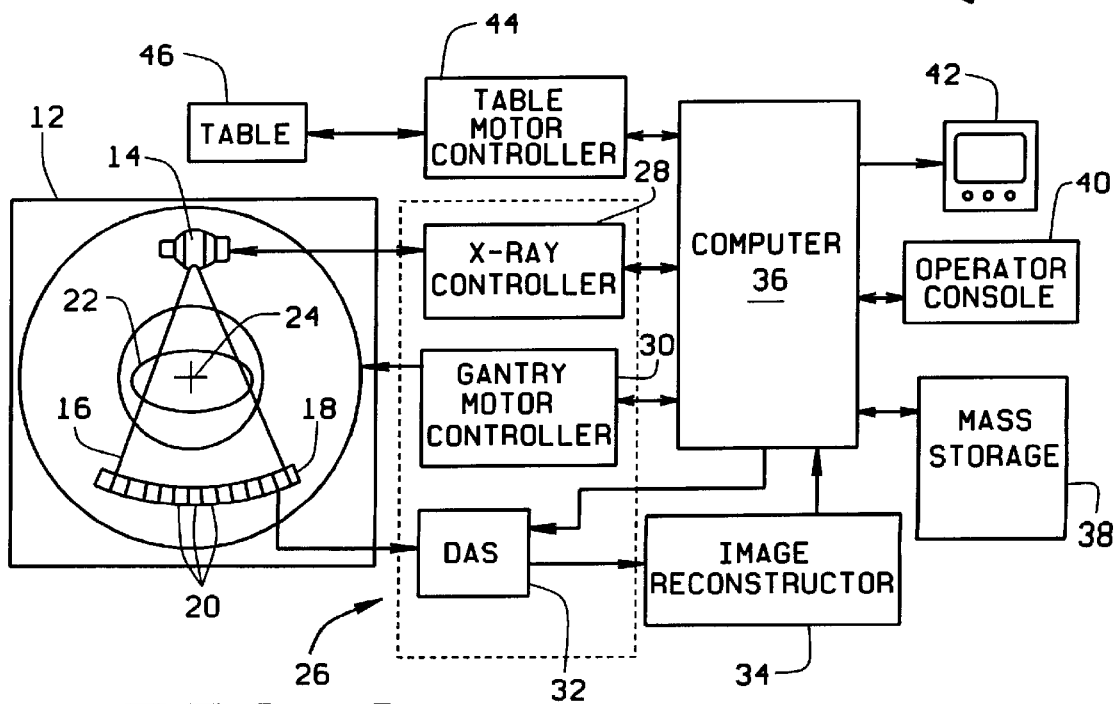
FIG. 2 is a block schematic diagram of the system illustrated in FIG. 1.
Figure 3:
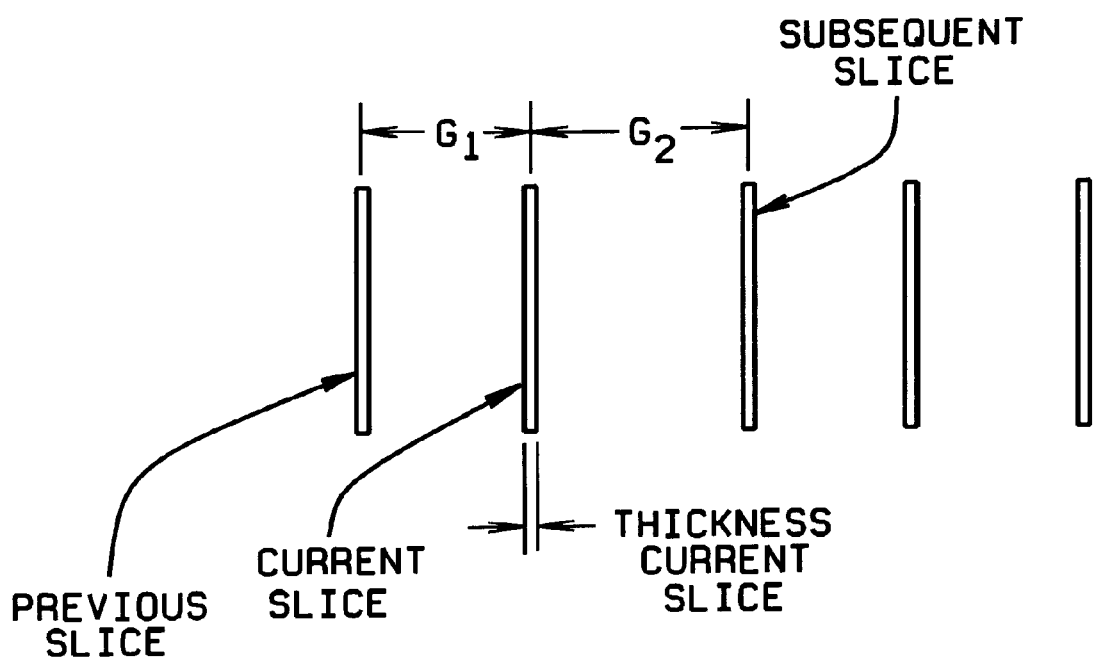
FIG. 3 is a pictorial view of gaps between image data in accordance with one embodiment of the present invention.

Referring to FIGS. 1 and 2, a computed tomograph (CT) imaging system is shown as including a gantry 12 representative of a "third generation" CT scanner. Gantry 12 has an x-ray source 14 that projects a beam of x-rays 16 toward a detector array 18 on the opposite side of gantry 12. X-ray beam is collimated by a collimate (not shown) to lie within in an X-Y plane of a Cartesian coordinate system and generally referred to as an "imaging plane". Detector array 18 is formed by detector elements 20 which together sense the projected x-rays that pass through a medical patient 22. Detector array 20 may be a single slice detector or a mulislice detector. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10.

Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

The following discussion which describes an algorithm for generating a calcification score sometimes refers specifically to a helical scan. The calcium scoring algorithm, however, is not limited to practice in connection with only helical scans, and may be used with other scans, such as axial scans. It should be further understood that the algorithm described below may be implemented in computer 36 and would process, for example, reconstructed image data. Alternatively, the algorithm could be implemented in image reconstructor 34 and supply corrected image data to computer 36. Other alternative implementations are, of course, possible.

As described above, in performing a CT scan, data from detector elements 20 is obtained. Such data is generally referred to in the art as projection data. In one embodiment, the CT scan includes projection data representative of at least one slice of patient 22. High speed image reconstruction is then performed to generate image data. With respect to image reconstruction, many image reconstruction algorithms currently are implemented in commercially available CT machines and the present calcification scoring algorithm could be implemented in connection with many of such reconstruction algorithms.

In accordance with one embodiment of the present invention, calcification scoring is determined by identifying a scorable region in the image data, defining at least one region of interest in the scorable region, and determining a density score. After determining a calcium score for each region of interest, a total calcium score is determined.

In one embodiment, at least one scorable region is identified in the image data by thresholding the image data. Particularly, each CT number in the image data is compared to a selected threshold level, or desired range. In general, different materials have different CT numbers. For example, bone has a CT number of over 200, water has a CT number of 0, soft-tissue (in the brain) has a CT number from approximately 20–50, and air has a CT number of −1000. Since the CT numbers are different for various materials, the threshold level may be selected so that certain types, or classes, of objects are excluded from further analysis. In one embodiment, one of many thresholding methods known in the art is used to identify the scorable regions. For example, using a selected threshold of 90, each portion of the image data having a CT number greater than or equal 90 is identified as a scorable region.

After determining a region of interest (ROI) for each scorable region, as known in the art, a density score is determined. The density score is determined using a weighting lookup table. In one embodiment, the weighting lookup table is stored in computer 36, and is:

$$\begin{cases} 0 & \text{If } H_P \leq (LT-1) \\ (S*H_P) - C & \text{If } LT \leq H_P \leq (UT-1) \\ (S*UT) - C & \text{If } H_P \geq UT \end{cases}$$

where:

$H_P$=a CT number of a pixel P,

LT=an lower threshold number,

UT=an upper threshold number,

S=a scaling factor, and

C=a constant.

The density score, DS, of each region of interest is then determined using the weighting lookup table. More specifically, a density score is determined for each pixel, $DS_P$, of each region of interest of each scorable region.

For example and in one embodiment, the density score of each pixel, $DS_P$, is determined using a scaling factor, S, of 0.01, a constant, C, of 0.5, a lower threshold, LT, of 90, and an upper threshold, UT, of 400 Hounsfield units. More specifically, for image data having one scorable region including a region of interest of 100 pixels, the density score of each of the 100 pixels is determined. Of course, other values of S, C, LT, and UT may be utilized to determine the density score of each pixel. For example, the lower threshold may be 130.

Next, the calcium score of each region of interest is determined. In one embodiment, the calcium score of each ROI is determined as $$CS_R = A_P * \left( \sum_{1}^{P_R} DS_P \right)$$

where:

$CS_R$=a calcium score of region of interest R, $A_P$=an area of a pixel P, $P_R$=a number of scorable pixels in the region of interest, and $DS_P$=a density score of pixel P.

More specifically and in one embodiment, the area of pixel P, $A_P$, is defined by the reconstruction algorithm. For example, where a 512×512 array is utilized to cover a circle having a 20 cm diameter, the pixel size is determined.

After determining the calcium score for each region of interest, the total calcium score is then determined. More specifically, a total calcium score is determined for all regions of interest by summing, or adding together, the calcium score from each region of interest.

In one embodiment, where the projection data does not represent evenly and/or continguous spaced slices, a weighted total calcium score is determined. The weighted total calcium score compensates, or corrects, for the unevenly and/or non-continguously spaced slices., i.e., uneven distances between slices and overlapping slices. More specifically, the total calcium score is:

$$TCS = N * \left( \sum_{1}^{R} (CS_R * F * G) \right)$$

where:
- N=a normalization factor,
- F=a scale factor,
- $G=G_1+G_2$,
- $G_1$=a distance between a previous slice and a current slice,
- $G_2$=a distance between the current slice and a subsequent slice.

When either a previous slice or a subsequent slice does not exist, the thickness of the current slice is used as a replacement of $G_1$ or $G_2$. For example, for a single slice having a thickness of 5 mm, the total calcium score is determined using G=5 mm.

In a similar manner, the total calcium score may be determined for overlapping slices of image data. Of course, other values of N may be determined, for example, N is 0.33.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method of determining coronary artery calcification in computed tomography image data, said method comprising the steps of:
   collecting at least one slice of image data;
   identifying at least one region of interest;
   determining a density score for each region of interest; and
   determining a calcification score using the density score, wherein the density score, DS, for each region of interest is determined in accordance with:

$$DS = \begin{cases} 0 & \text{If } H_P \le (LT-1) \\ (S*H_P) - C & \text{If } LT \le H_P \le (UT-1) \\ (S*UT) - C & \text{If } H_P \ge UT \end{cases}$$

where:
- $H_P$=a CT number of pixel P,
- LT=an lower threshold number,
- UT=an upper threshold number,
- S=a scaling factor, and
- C=a constant.

2. A method in accordance with claim 1 further comprising the step of identifying a scorable region prior to identifying at least one region of interest.

3. A method of determining coronary artery calcification in computed tomography image data, said method comprising the steps of:
   collecting at least one slice of image data;
   identifying at least one region of interest;
   determining a density score for each region of interest;
   determining a slice calcium score of each region of interest using the density score in accordance with:

$$CS_R = A_P * \left( \sum_{1}^{P_R} DS_P \right); \text{ and}$$

determining a total calcium score using each slice calcium score;

where:
- $CS_R$=a calcium score of each region of interest,
- $A_P$=an area of a pixel P,
- $P_R$=a number of scalable pixels in the region of interest, and
- $DS_P$=a density score of pixel P.

4. A method in accordance with claim 3 wherein determining the total calcium score comprises the step of determining a weighted total calcium score.

5. A method in accordance with claim 4 wherein determining the weighted total calcium score is in accordance with:

$$TCS = N * \left( \sum_{1}^{R} (CS_R * F * G) \right)$$

where:
- N=a normalization factor,
- F=a scale factor,
- $G=G_1+G_2$,
- $G_1$=a distance between a previous slice and a current slice,
- $G_2$=a distance between the current slice and a subsequent slice,
- R=a number of regions of interest.

6. A system for determining a level of calcification in image data, the image data from a tomographic scan, said system comprising an x-ray source and a detector array, said system configured to:
   collect at least one slice of image data;
   identify at least one region of interest;
   determine a density score for each region of interest; and
   determine a calcification score using said density score;
   wherein said density score for each region of interest is determined in accordance with:

$$DS = \begin{cases} 0 & \text{If } H_P \le (LT-1) \\ (S*H_P) - C & \text{If } LT \le H_P \le (UT-1) \\ (S*UT) - C & \text{If } H_P \ge UT \end{cases}$$

where:
- $H_P$=a CT number of pixel P,
- LT=an lower threshold number,
- UT=an upper threshold number,
- S=a scaling factor, and
- C=a constant.

7. A system in accordance with claim 6 further configured to identify a scorable region prior to identifying at least one region of interest.

8. A system in accordance with claim 6 wherein said detector array is a multislice detector array.

9. A system for determining a level of calcification in image data, the image data from a tomographic scan, said system comprising an x-ray source and a detector array, said system configured to:
- collect at least one slice of image data;
- identify at least one region of interest;
- determine a density score for each region of interest;
- determine a slice calcium score of each region of interest using said density score in accordance with:

$$CS_R = A_P * \left(\sum_{1}^{P_R} DS_P\right); \text{ and}$$

- determine a total calcium score using each slice calcium score, where:
- $CS_R$=a calcium score of each region of interest,
- $A_P$=an area of a pixel P,
- $P_R$=a number of scalable pixels in the region of interest, and
- $DS_P$=a density score of pixel P.

10. A system in accordance with claim 9 wherein to determine said total calcium score, said system is configured to determine a weighted total calcium score.

11. A system in accordance with claim 10 wherein said weighted total calcium score is determined in accordance with:

$$TCS = N * \left(\sum_{1}^{R} (CS_R * F * G)\right)$$

where:
- N=a normalization factor,
- F=a scale factor,
- $G=G_1+G_2$,
- $G_1$=a distance between a previous slice and a current slice,
- G=a distance between a prior slice and a subsequent slice, and
- R=a number of regions of interest.

* * * * *